United States Patent [19]

Althuis

[11] 3,917,645
[45] Nov. 4, 1975

[54] PYRROLYACRYLIC ACIDS WITH HYPOGLYCEMIC ACTIVITY

[75] Inventor: Thomas H. Althuis, New London, Conn.

[73] Assignee: Pfizer Inc., New York, N.Y.

[22] Filed: Dec. 26, 1972

[21] Appl. No.: 318,666

[52] U.S. Cl. ...... 260/326.2; 260/240 F; 260/326.47; 260/326.5 J; 424/274
[51] Int. Cl.² ........................................ C07D 207/32
[58] Field of Search ..................... 260/326.2, 326.47

[56] References Cited
OTHER PUBLICATIONS
Herz et al., Chem. Abs. Vol. 42:3390a abs of. J. Am. Chem. Soc. 70:503 (1948).

*Primary Examiner*—Raymond V. Rush
*Attorney, Agent, or Firm*—Connolly and Hutz

[57] ABSTRACT

A compound selected from those of the formula

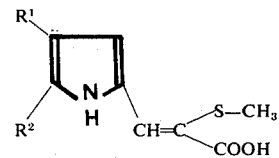

and the ethyl esters and sodium salts thereof, wherein $R^1$ is H or methyl, and $R^2$ is H, lower alkyl, phenyl or monosubstituted phenyl, whose monosubstituent is methyl, methoxy or chloro, and the utility thereof as oral hypoglycemic agents are disclosed.

3 Claims, No Drawings

PYRROLYACRYLIC ACIDS WITH HYPOGLYCEMIC ACTIVITY

BACKGROUND OF THE INVENTION

This invention relates to new and useful pyrrolylacrylic acid derivations which are effective in reducing blood sugar levels. More particularly, it is concerned with certain novel 4 and 5 substituted 3-(2-pyrrolyl)-2-methylthioacrylic acids and the pharmaceutically acceptable base salts and ethyl esters thereof, which are useful as oral hypoglycemic agents for lowering the blood sugar levels of diabetic subjects. Recently much effort has been expended to discover new oral hypoglycemic agents. For the most part, these efforts have principally involved the synthesis and testing of various new and heretofore unavailable organic compounds, particularly in the area of the sulfonylureas. However, in the search for still better oral hypoglycemic agents, very little has been discovered about the activity of various ring-nitrogen compounds such as pyrroles and their derivatives.

The known 3-(2-pyrrolyl)-2-mercaptoacrylic acid, although active as a hypoglycemic agent, is decidedly toxic. On the other hand, 3-(2-pyrrolyl)-2-cyano- and -2-benzylithio-acrylic acids have failed to demonstrate hypoglycemic activity. In the face of this unfavorable evidence, an effort was nevertheless made to prepare other 3-(2-pyrrolyl) acrylic acid derivatives in the search for effective hypoglycemic agents.

SUMMARY OF THE INVENTION

In accordance with the present invention, it has now been rather surprisingly found that certain novel 3-(2-pyrrolyl)-2-methylthioacrylic acid derivatives, are useful as oral hypoglycemic agents for the treatment of diabetic subjects. The novel compounds of this invention are all selected from the group consisting of compounds of the formulae:

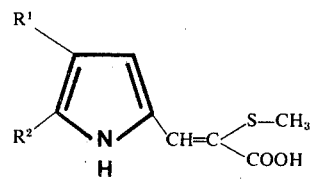

and the ethyl esters and sodium salts thereof, wherein
$R^1$ is H or methyl, and
$R^2$ is H, lower alkyl, phenyl or monosubstituted phenyl,
whose monosubstituent is methyl, methoxy or chloro.

DETAILED DESCRIPTION OF THE INVENTION

The compounds of the present invention are prepared in the manner indicated in scheme 1. In the first step, (1⟶3), the known pyrrole 2-carboxaldehyde (1) is condensed in buffered medium with rhodanine (2), to provide compound 3. Suitable buffered systems are, for example, sodium acetate and glacial acetic acid; or, concentrated ammonium hydroxide and ammonium chloride in ethanol. The reaction is usually carried out at elevated temperatures, conveniently the reflux temperature, however temperatures lower than the reflux temperature may also be employed. The usual time required for the completion of the reaction is 1 to 4 hours. In the case of less reactive aldehydes, longer reaction times may be necessary. The desired (3) crystallizes upon cooling of the reaction mixture and is isolated by filtration.

The resulting (3), is then hydrolyzed to provide 4. The hydrolysis is most conveniently conducted by heating 3 with aqueous sodium hydroxide or barium hydroxide, at about 70° for 0.5 hours or until the starting material has been completely consumed.

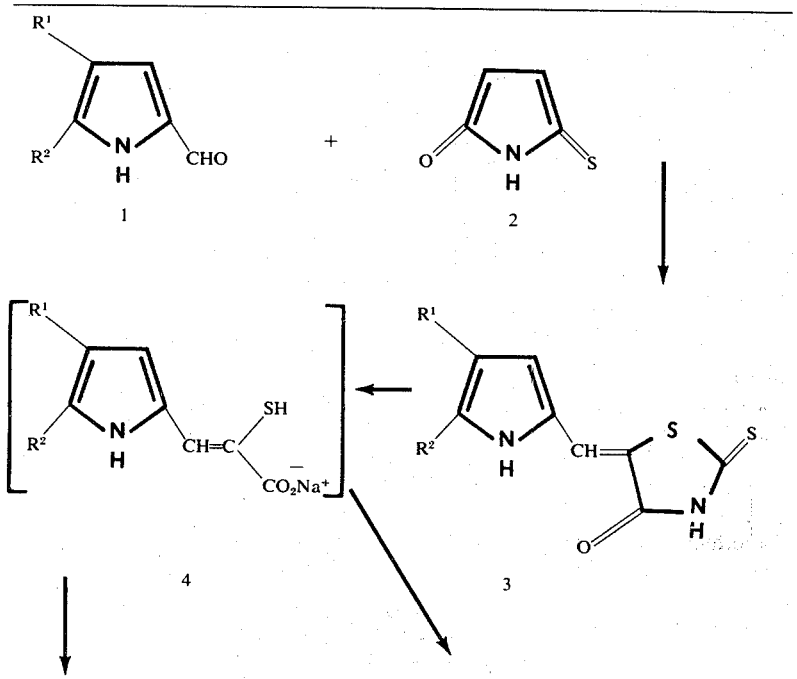

Scheme 1

Scheme 1 (-continued)

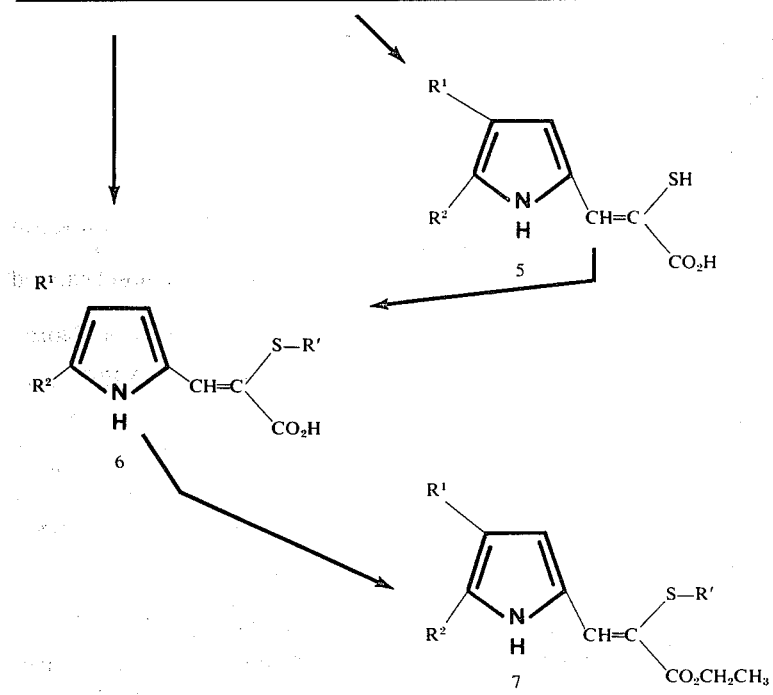

The resulting 4 may be isolated as the free acid (5) by acidification of the hydrolysis reaction medium after hydrolysis is completed with dilute hydrochloric acid or alternatively 4 may be alkylated directly with a suitable alkyl halide such as an alkyl bromide or iodide in ethanol to provide 6 directly. 5 may be alkylated in a similar manner to provide 6 by first forming an alkali metal salt, typically the sodium salt, and reacting this salt with the desired alkyl halide in methanol solution. The alkali metal salts are formed using alkali metal alkoxides such as sodium methoxide in methanol. The preferred procedure for the preparation of 6, however, does not require the isolation of 5 but rather the direct alkylation of the crude reaction mixture obtained from the hydrolysis reaction with an alkylating agent, preferably a dialkyl sulfate or a suitable alkyl halide such as an alkyl bromide or iodide. The reaction is conducted between 70° and 90° for a period of 1-3 hours and isolation of the product is achieved by acidification of the reaction mixture extraction with ether. The ether solution of the product is dried and evaporated to yield the desired 6.

The compounds of the type 6 may be esterified 6→6 7) by contacting them with the desired alcohol, typically ethanol, in the presence of dicyclohexylcarbodiimide. Such a reaction is typically carried out in room temperature for about 2 or 3 days in a reaction inert solvent such as ether or chloride. The product is isolated by distillation under reduced pressure.

As previously indicated, the pyrrolylacrylic acid and their base salts and ethyl esters of this invention are all readily adapted to therapeutic use as oral hypoglycemic agents in view of their ability to lower the blood sugar of diabetic subjects. For instance, 3-(2-pyrrolyl)-2-methylthioacrylic acid has shown hypoglycemic activity in the fasted alloxanized rat and in the normal fasted guinea pig with pronounced hypoglycemia being observed in the latter species at dose levels ranging from 25 mg./kg. to 100 mg./kg. Additionally, none of these compounds cause any unwanted side effects to occur in the subjects to whom they are so administered, i.e., no problems of toxicity or any untoward side effects of either a gross or microscopic pathological nature have ever been encountered with these compounds when they are orally administered in the manner indicated above.

In accordance with a method of treatment of the present invention, the herein described compounds can be administered to a diabetic subject orally or by the intravenous route. In general, these compounds are most desirably administered in doses ranging from about 25 mg. up to 1.0 g per day, although variations will still necessarily occur depending upon the weight of the subject being treated. However, a dosage level that is in the range of from about 0.5 mg. to about 20 mg. per kg. of body weight per day is most desirably employed in order to achieve effective results. In some instances, dosage levels below the lower limit of the aforesaid range may be more than adequate, while in other cases still larger dosages may be employed without causing any harmful or deleterious side effects to occur provided that such higher dose levels are first divided into several smaller doses that are to be administered throughout the day.

In connection with the use of the pyrrolylacrylic acid compounds of this invention for the treatment of diabetic subjects, it is to be noted that they may be administered either alone or in combination with pharmaceutically acceptable carriers and that such administration can be carried out in both single and multiple dosages. More particularly, the novel compounds of this invention can be administered in a wide variety of different dosage forms, i.e., they may be combined with various pharmaceutically acceptable inert carriers in the form of tablets, capsules, lozenges, troches, hard candies, powders, sprays, aqueous suspensions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage.

In the latter connection, the compounds of this invention may bee administered in suitable unit dosage forms which will preferably contain at least about 5 mg. per dosage unit, although concentration levels in the range of from about 5 mg. to about 250 mg. per unit dosage per day may be employed to advantage. When larger doses of these hypoglycemic agents are to be employed, it is preferable to administer two or more unit doses at various time intervals, adjusting, if necessary, the content of the antidiabetic agent per unit dosage form accordingly.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules, preferred materials in this connection would also include the high molecular weight polyethylene glycols. When aqueous suspensions and/or elixirs are desired for oral administration, the essential active ingredient may be combined with various sweetening or flavoring agents, coloring matter or dyes and if so desired, emulsifying and/or suspending agents, together with such diluents as water, ethanol, propylene glycol, glycerin and various like combinations thereof.

This invention is further illustrated by the following examples, which are not to be construed in any way or manner as imposing limitations upon the scope thereof.

EXAMPLE I 5-(2-pyrrolylmethylene)rhodanine

A mixture of 7.0 (0.566 mole) of rhodanine, 30.7 (0.518 mole) of $NH_4Cl$, 39.5 ml of aqueous ammonia and 800 ml of ethanol were heated to 70° after which a solution of 50.0 g (0.526 moles) of pyrrole-2-carboxaldehyde (*Org. Syn.*, Coll Vol. 4, 831 (1963)) in ethanol was added. After stirring an additional hour (at 70°–75°) the reaction mixture was cooled and diluted with 500 ml of ice water. The crude product was isolated by filtration: yield: 88.9 g (81.5%), mp 276–277° (dec).

EXAMPLE II 3-(2-pyrrolyl)-2-methylthioacrylic acid

Under a nitrogen atmosphere 43.5 g (0.21 mole) of 5-(2-pyrrolylmethylene) rhodanine was heated with 260 ml 15% NaOH at 65°–70° for 20 minutes. Then 52.9 g (0.42 mole) of dimethyl sulfate was added dropwise during which time the temperature rose to 90°. The solution was stirred an additional 30 minutes, cooled to room temperature, diluted with 200 ml water, acidified with 10% HCl and extracted with ether. The extract was dried with anhydrous $Na_2SO_4$ and the ether removed under vacuum. The resulting dark colored solid was recrystallized from benzene-hexane yielding dark green crystals which were further purified by column chromatography (Silica gel, 99% benzene, 1% acetic acid) and another recrystallization from benzene-hexane: yellow needles, 23.8 g (62%) mp 138°–139° (dec.)

| Anal: $C_8H_9NO_2S$ | C | H | N | S |
|---|---|---|---|---|
| Calc. | 52.44%; | 4.96%; | 7.64%; | 17.50 |
| Found. | 52.53 | 4.88 | 7.44 | 16.71 |

EXAMPLE III 5-(5-methyl-2-pyrrolylmethylene)rhodanine

A mixture of 26.6 g (0.20 mole) of rhodanine, 15 ml (0.247 mole) of concentrated ammonia, 11.7 g (0.22 mole) of ammonium chloride were partially dissolved in 200 ml of absolute ethanol and heated to 80°. Then 21.8 g (0.20 mole) of 5-methylpyrrole 2-carboxaldehyde (H. Fisher, H. Beyer, and E. Zaucker, *Ann.*, 486, 55 (1931)) was added and heating continued for one hour. The mixture was cooled, diluted with 1500 ml of ice water, and the crude product isolated by filtration: yield: 37.5 g (84%), mp 285° (dec).

EXAMPLE IV 3-(5-methyl-2-pyrrolyl)-2-methylthioacrylic acid

This acid was prepared by the method described Example II in 54% yield, mp 165–165.5° (dec).

| Anal: $C_9H_{11}NO_2S$ | C | H | N | S |
|---|---|---|---|---|
| Cal. | 54.80 | 5.62 | 7.10 | 16.25 |
| Found. | 55.05 | 5.70 | 7.00 | 15.99 |

The compounds under III, IV and V were prepared by methods described in sections I and II.

EXAMPLE V 5-(5-Ethyl-2-pyrrolylmethylene)rhodanine

This compound was prepared from 5-ethylpyrrole-2-carboxaldehyde, (H, Fisher, H. Beyer, and E. Zaucker, *Ann.*, 486, 55 (1931)) by the procedure of Example I in 84% yield, mp 264°–265° (dec).

EXAMPLE VI 3-(5-Ethyl-2-pyrrolyl)-2-methylthioacrylic acid.

This compound was prepared by the procedure of Example II in 54% yield, mp 114°–115° (dec).

| Anal: $C_{10}H_{13}NO_2S$ | C | H | N | S |
|---|---|---|---|---|
| Calc. | 56.85 | 6.20 | 6.63 | 15.18 |
| Found. | 57.02 | 6.00 | 6.54 | 15.25 |

EXAMPLE VII 5-(4-methyl-2-pyrrolylmethylene)rhodanine

This compound was prepared from 4-methylpyrrole-2-carboxaldehyde, B. M. Badger, R. L. N. Harris and R. A. Jones, *Aust. J. Chem.*, 17, 1010 (1964) by the procedure of Example I in 79% yield, mp 256°

EXAMPLE VIII 3-(4-methyl-2-pyrrolyl-2-methylthioacrylic acid

This compound was prepared by the procedure of Example II in 30% yield, mp 142.5° (dec).

| Anal: $C_9H_{11}NO_2S$ | C | H | N | S |
|---|---|---|---|---|
| Calc. | 54.80 | 5.62 | 7.10 | 16.25 |
| Found. | 54.73 | 5.62 | 6.95 | 16.10 |

EXAMPLE IX 5-(5-phenyl-2-pyrrolylmethylene)rhodanine

This compound was prepared from 5-phenylpyrrole-2-carboxaldehyde G. Plancher and G. Rossi, *Gazz Chim. Ital.*, 59, 352 (1929), by the procedure of Example I in 84% crude yield and was used without further purification for the subsequent step.

EXAMPLE X 3-(5-phenyl-2-pyrrolyl)-2-methylthioacrylic acid

This compound was prepared by the procedure of Example II in 10% yield. mp 201–202° (dec).

| Anal: $C_{14}H_{13}NO_2S$ | | | |
|---|---|---|---|
| Calc. | 64.84 | 5.06 | 5.41 |
| Found. | 64.57 | 5.06 | 5.38 |

Substituted 5-(5-phenyl-2-pyrrolyl)-2-methylthioacrylic acids are prepared from the appropriate starting materials by the procedures of Examples IX and X.

EXAMPLE XI preparation of ethyl 3-(2-pyrrolyl)-2-methylthioacrylate

A solution of 2.5 g (0.012 mole) of dicyclohexylcarbodiimide in 15 ml of ether was added at room temperature to a solution of 2.0 g (0.011 mole) of 3-(2-pyrrolyl)-2-methylthioacrylic acid and 5.1 g (0.11 mole) of absolute ethanol in 25 ml of ether and stirred for two days. Acetic acid and water were added to destroy excess DCC; the insoluble solids were removed by filtration; and the ether layer was dried over anhydrous sodium sulfate and concentrated to yield a red oil which was vacuum distilled: 1.03 g (44% yield), b.p. 126.5° at 0.4 mm.

| Anal: $C_{10}H_{13}NO_2S$ | C | H | N | S |
|---|---|---|---|---|
| Calc. | 56.85 | 6.20 | 6.63 | 15.17 |
| Found. | 57.09 | 6.40 | 6.69 | 14.83 |

The ethyl esters of the other 3-(2-pyrrolyl)-2-methylthioacrylic acids of the invention are prepared in the manner described above.

What is claimed is:

1. A compound selected from those of the formula

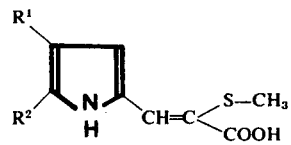

and the ethyl esters and sodium salts thereof, wherein
$R^1$ is H or methyl, and
$R^2$ is H, lower alkyl, phenyl or monosubstituted phenyl,
whose monosubstituent is methyl, methoxy or chloro.

2. 3-(2-Pyrrolyl)-2-methylthioacrylic acid.

3. 3-(2-Pyrrolyl)-2-methylthioacrylic acid sodium salt.

* * * * *